Patented Aug. 22, 1950

2,520,088

UNITED STATES PATENT OFFICE 2,520,088

PROCESS OF PREPARING PYRAZINES

Reuben G. Jones, Indianapolis, Ind., assignor to Eli Lilly and Company, Indianapolis, Ind., a corporation of Indiana No Drawing. Application May 28, 1948, Serial No. 29,959

11 Claims. (Cl. 260—250)

My invention relates to a novel synthesis of organic compounds, and more particularly to a synthesis of hydroxypyrazines.

Heretofore, the synthesis of pyrazines has been difficult of accomplishment. The methods available to the art with few exceptions have yielded the desired pyrazine compounds only in poor yields and by laborious procedures. Many attempts have been made to overcome the difficulties inherent in the processes of the prior art and to provide a suitable method of synthesis of hydroxypyrazine compounds which, because of their utility in connection with theoretical and practical chemistry, and their ready convertibility into other pyrazine compounds, are of considerable importance.

An object of my invention is to provide a simple process for the preparation of hydroxypyrazines. Another object is to provide a method of synthesizing intermediates useful in the synthesis of important organic compounds, for example, folic acid and the like. Other objects will be apparent from the following description of my invention.

In the accomplishment of the above and other objects, I have discovered that hydroxypyrazines can be obtained in excellent yield by condensing 1,2-dicarbonyl compounds with α-aminocarboxylic acid amides.

A preferred manner of carrying out the process of my invention is as follows: Approximately molar-equivalents of the 1,2-dicarbonyl compound and the α-amino acid amide are dispersed in a solvent. The mixture is cooled to about —10° C. and to it is added with stirring a solution contained about a molar-equivalent of an alkali or base having a dissociation constant of at least about $1 \times 10^{-7}$. Condensation of the dicarbonyl compound and the amide occurs and a substituted hydroxypyrazine is produced.

Isolation of the hydroxypyrazine from the reaction mixture is effected by neutralizing the reaction mixture with an acid and separating, as by filtration, the hydroxypyrazine which frequently is insoluble in the neutralized reaction mixture and so precipitates. Alternatively, in case the hydroxypyrazine is quite soluble in the neutralized reaction mixture, the neutral mixture is evaporated to dryness, preferably in vacuo, and the hydroxypyrazine is separated by extraction with and subsequent evaporation of an organic solvent in which the hydroxypyrazine is selectively soluble. Additional alternative isolation procedures will be apparent to those skilled in the art. The hydroxypyrazine which is isolated is purified by conventional means, for example, by recrystallization from one or more solvents.

The following equation showing the formation of 2-hydroxy-5,6-dimethylpyrazine from diacetyl and glycine amide is given for the purpose of illustrating the reaction involved in the preparation of hydroxypyrazine compounds in accordance with my invention:

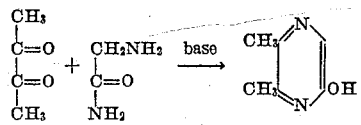

1,2-dicarbonyl compounds which may be employed in my invention include 1,2-diketone and α-ketoaldehydes. Illustrative examples of suitable dicarbonyl compounds are glyoxal, methylglyoxal, ethylglyoxal, diacetyl, diethylglyoxal, propylglyoxal, dipropylglyoxal, phenylglyoxal, benzil, dibenzylglyoxal, o-benzoquinone, and 1,2-diketocyclohexane. It will be apparent from the above-mentioned compounds that both aliphatic and aromatic dicarbonyl compounds may be used in carrying out my invention.

Many α-amino acid amides are suitable for use in my invention, illustrative examples of which are glycine amide, alanine amide, tyrosine amide, α-amino-n-butyric acid amide, methionine amide, aspartic acid amide, aminomalonamide, α-aminophenylacetamide, threonine amide, valine amide, tryptophane amide, phenylalanine amide, and the like. The preparation of the amino acid amides conveniently is carried out according to the procedure of Königs and Mylo, disclosed in Ber. 41, 4427 (1908).

As noted above in the description of the preferred manner of carrying out my invention, a base, i. e. an alkaline material, is employed for effecting the condensation of the 1,2-dicarbonyl compound and the α-amino acid amide. Suitable bases are those having a dissociation constant of about $1 \times 10^{-7}$ or greater. Organic bases may be used, such bases including basic nitrogen compounds, of which examples are piperidine, diethylamine, triethylamine, ethylamine, methylamine, secondary butylamine and the like. As will be understood by those skilled in the art, organic bases which will react with the 1,2-dicarbonyl compound are not desirable since the reaction between the chosen base and the 1,2-dicarbonyl compound reduces the amount of 1,2- dicarbonyl compound available for the desired reaction, and moreover the presence of the unwanted by-product interferes with the formation and isolation of the desired reaction product. Alternatively, inorganic bases and basic salts having a dissociation constant of at least about $1 \times 10^{-7}$ may be employed as condensing agents. Satisfactory inorganic basic compounds include metal hydroxides, metal carbonates, metal bicarbonates and the like.

It should be noted that various α-aminocarboxylic acid amides are in themselves sufficiently basic to cause their condensation with a 1,2-dicarbonyl compound to proceed in a satisfactory manner so that no added base is necessary. Such is the case, for example, with aminomalonamide which will react readily with 1,2-dicarbonyl compounds of the nature of diacetyl to produce the hydroxypyrazine.

The function of the base in promoting the desired reaction between the 1,2-dicarbonyl compound and the α-amino acid amide is not understood, but the presence of a sufficient amount of basic material to produce an alkaline reaction mixture appears to be necessary for the initiation and completion of the condensation reaction. The reaction may be carried out by using an amount of base less than the stoichiometric or equivalent amount, and the desired pyrazine compound will be produced in good yield. However, in general it is preferable to employ a molecularly equivalent amount of the base since the use of an equivalent amount is productive of higher yields of the pyrazine compound.

The solvent which is employed as a dispersant of the reagents used in the preparation of the hydroxypyrazine may be any of numerous solvents. The solvent must, of course, be an inert solvent; that is one which will not take part in the reaction. It is desirable to employ a solvent which possesses a substantial solubility for all the reagents involved in the reaction, but the production of the hydroxypyrazine may be accomplished with but slight decrease in yield even though one or more of the reagents has only a slight solubility in the selected solvent. Of the numerous solvents which may be employed, illustrative examples are water; monobasic alcohols, such as methanol, ethanol, butanol, hexanol and the like; polybasic alcohols, such as ethyleneglycol, propyleneglycol; hydrocarbons, such as benzene and toluene; and chlorinated hydrocarbons, such as chloroform, ethylene dichloride and carbon tetrachloride. Additional suitable solvents will be suggested by the above-mentioned examples.

It will be apparent that when using unsymmetrical 1,2-diketones and ketoaldehydes in my novel process, there may be produced a mixture of two isomeric hydroxypyrazines. Thus, for example, reaction of alanine amide with methylglyoxal may give rise to 3,5-dimethyl-2-hydroxypyrazine and 3,6-dimethyl-2-hydroxypyrazine. In practice, however, it is often observed that the production of one isomer to the substantial exclusion of the other isomer occurs. Thus, for example, condensation of methylglyoxal with aminomalonamide yields only 2-hydroxy-3-carboxamido-6-methylpyrazine. In case a mixture of isomers results, the mixture may be separated into its components by known methods of fractional crystallization, selective elution and the like.

The condensation of the 1,2-dicarbonyl compound and the α-amino acid amide generally is carried out at a temperature below room temperature to avoid too rapid a reaction and the consequent formation of tarry products. A temperature below 0° C. is usually desirable, and preferably the temperature at which the reactants are mixed is about −10 to about −30° C. After mixing the reactants at a low temperature the reaction mixture is allowed to rise to room temperature slowly during which time the condensation of the reactants is substantially completed. However, higher reaction temperatures may be employed when the 1,2-dicarbonyl compound used in the reaction is one which contains carbonyl groups of relatively low activity as is the case, for example, with diaryl diketones such as benzil, and sterically hindered carbonyl compounds. In such cases temperatures as high as 100° are not only satisfactory but are desirable in order to reduce the period of time required for the condensation to take place.

The following specific examples will serve to illustrate the practice of my invention.

EXAMPLE 1

*Preparation of 2-hydroxy-3-carboxamidopyrazine*

2-hydroxy-3-carboxamidopyrazine represented by the formula

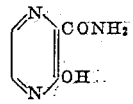

may be prepared as follows:

25 g. (0.166 mol) of 40 percent aqueous glyoxal solution are diluted with 25 ml. of water, and 11.7 g. (0.10 mol) of finely powdered aminomalonamide are added. The resulting mixture is cooled to about −15° C. by means of an ice-salt mixture and 10 ml. (0.125 mol) of 12.5 N sodium hydroxide solution are added dropwise with stirring, the temperature of the reaction mixture being kept below −10° C. The mixture is allowed to stand at room temperature for about 2 hours during which time the reaction is completed and a crystalline precipitate comprising the sodium salt of 2-hydroxy-3-carboxamidopyrazine separates. 10 ml. of glacial acetic acid are added with stirring and the resulting precipitate of 2-hydroxy-3-carboxamidopyrazine is filtered off, washed with water and acetone and dried. 2-hydroxy-3-carboxamidopyrazine is obtained in a yield of about 12.5 g., or 90 percent of theory. After recrystallization from water it melts with decomposition at about 265° C.

EXAMPLE 2

*Preparation of 2-hydroxy-3-carboxamidopyrazine*

2-hydroxy-3-carboxamidopyrazine may also be prepared as follows:

9.86 g. (1.7 mol) of solid glyoxal polymer are dissolved in 50 ml. of methanol, and 11.7 g. (0.10 mol) of aminomalonamide are added. The solution is cooled to about 0° C. by means of an ice-salt mixture, and 12.8 ml. of diethylamine are added dropwise while stirring. After addition of the diethylamine, the mixture is allowed to stand at room temperature for 2 hours. 10 ml. of glacial acetic acid are then added with stirring, and the mixture is poured into 50 ml. of cold water whereupon there is produced a precipitate of 2-hydroxy-3-carboxamidopyrazine. The precipitate is filtered off, washed with water and acetone, and dried.

EXAMPLE 3

*Preparation of 2-hydroxy-3-carbamido-5,6-dimethylpyrazine*

2-hydroxy-3-carbamido-5,6-dimethylpyrazine represented by the formula

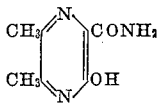

may be prepared as follows:

8.6 (0.10 mol) of diacetyl are dissolved in 25 ml. of ethanol and 11.7 g. (0.10 mol) of aminomalonamide are added. The solution is cooled to about 0° C. and maintained at that temperature. To the mixture 10 ml. of 12.5 N potassium hydroxide solution are added dropwise, with stirring. The mixture is allowed to stand for 2 hours at room temperature, during which time a precipitate of the potassium salt of 2-hydroxy-3-carbamido-5,6-dimethylpyrazine separates. 10 ml. of glacial acetic acid are added to convert the salt to the free phenol, i. e. 2-hydroxy-3-carbamido-5,6-dimethylpyrazine. The 2-hydroxy-3-carbamido-5,6-dimethylpyrazine is filtered off, washed with water, and dried. It is obtained in a yield of about 93 percent of theory. Upon recrystallization from pyridine it melts with decomposition at about 231–232° C.

EXAMPLE 4

2-hydroxy-3-carboxamido-5,6-dimethylpyrazine may also be prepared as follows:

8.6 g. of diacetyl are mixed with 25 ml. of water, the mixture is cooled to about −10° C. and about 11.7 g. of aminomalonamide are added with stirring. The reaction mixture is allowed to warm to room temperature and is maintained at that temperature for about one-half hour. The reaction mixture is then neutralized with acetic acid and cooled to about 0° C. The 2-hydroxy-3-carboxamido-5,6-dimethylpyrazine which separates is filtered off, washed with a small amount of cold water and dried.

EXAMPLE 5

*Preparation of 2-hydroxy-5-methylpyrazine*

2-hydroxy-5-methylpyrazine represented by the formula

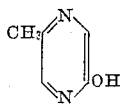

may be prepared as follows:

To a solution of 8.8 g. of glycine amide in 50 ml. of methanol cooled to about −30° C. is added a similarly cooled solution of 7.2 g. of methyl glyoxal in 25 ml. of methanol. To the mixture maintained at a temperature below about −10° C. are added, dropwise and with stirring, 10 ml. of 12.5 N aqueous sodium hydroxide solution. The temperature of the reaction mixture is held at −5° C. for 2 hours, and the mixture is then permitted to rise to room temperature and is there maintained for a further period of 3 hours. 10 ml. of 12 N hydrochloric acid are added to the mixture to neutralize the sodium hydroxide and 5 g. of solid sodium bicarbonate are added to neutralize excess hydrochloric acid. The mixture is evaporated to dryness in vacuo and the resulting residue, which contains the desired 2-hydroxy-5-methylpyrazine, is extracted with three 100 ml. portions of boiling chloroform. The chloroform extracts are combined and evaporated in vacuo, leaving as a residue 8.5 g. of 2-hydroxy-5-methylpyrazine. The 2-hydroxy-5-methylpyrazine is purified by recrystallization from ethyl acetate. About 5.2 g. (42 percent of theory) of pure 2-hydroxy-5-methylpyrazine melting at about 144–146° C. are obtained.

EXAMPLE 6

*Preparation of 2-hydroxy-3,5,6-trimethylpyrazine*

2-hydroxy-3,5,6-trimethylpyrazine represented by the formula

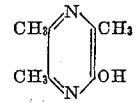

is prepared from 8.6 g. of diacetyl and 10.4 g. of alanine amide according to the procedure described in Example 4 for the preparation of 2-hydroxy-5-methylpyrazine. 2-hydroxy-3,5,6-trimethylpyrazine melting at about 193–194° C. is obtained in the amount of 8.0 g. which corresponds to about 77 percent of theory.

EXAMPLE 7

*Preparation of 2-hydroxy-3-carboxamido-5,6-diphenylpyrazine*

2-hydroxy-3-carboxamido-5,6-diphenylpyrazine represented by the formula

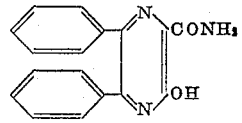

may be prepared as follows:

A mixture consisting of 11.7 g. of aminomalonamide, 21 g. of benzil and 350 ml. of 50 percent aqueous ethanol is heated to about 65–70° C. and 10 ml. of 12.5 N aqueous hydroxide solution are slowly added with stirring. The reactants dissolve to form a clear brown solution in which after standing for a few minutes there is formed a copious crystalline precipitate of the sodium salt of 2-hydroxy-3-carbamido-5,6-diphenylpyrazine. The mixture is cooled to about 10° C., the crystals are separated by filtration and washed with acetone. The crystals are suspended in 200 ml. of acetone and the suspension is treated with 20 ml. of concentrated hydrochloric acid to liberate 2-hydroxy-3-carboxamido-5,6-diphenylpyrazine as the free phenol. The resulting acetone solution is diluted with 500 ml. of water, whereupon the 2-hydroxy-3-carboxamido-5,6-diphenylpyrazine precipitates as an oil which crystallizes upon standing for a short period of time. The 2-hydroxy-3-carboxamido-5,6-diphenylpyrazine is purified by recrystallization from a mixture of acetone and petroleum ether. 23 g. of 2-hydroxy-3-carboxamido-5,6-diphenylpyrazine melting at about 174–175° C. are obtained.

EXAMPLE 8

*Preparation of 2-hydroxy-5,6-diphenylpyrazine*

2-hydroxy-5,6-diphenylpyrazine represented by the formula

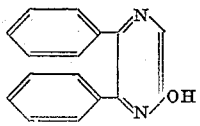

may be prepared as follows:

A mixture consisting of 8.8 g. of glycine amide, 21.0 g. of benzil, and 350 ml. of 50 percent aqueous methanol is heated to about 70° C. and 10 ml. of aqueous 12.5 N sodium carbonate solution are added slowly with stirring. The mixture is then heated to refluxing temperature for 30 minutes. The mixture is cooled and neutralized with about 20 ml. of concentrated hydrochloric acid whereupon the 2 - hydroxy - 5,6 - diphenylpyrazine precipitates. It is filtered off and purified by recrystallization from a mixture of acetone and petroleum ether. 2 - hydroxy - 5,6 - diphenylpyrazine melting at about 225–227° C. is obtained in a yield of about 22.7 g. which corresponds to about 97 percent of theory.

EXAMPLE 9

*Preparation of 2-hydroxy-3-(β-methylthioethyl)-pyrazine*

2 - hydroxy - 3 - (β - methylthioethyl)pyrazine represented by the formula

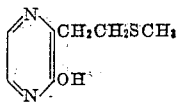

may be prepared as follows:

To a solution of 13.4 g. of methionine amide in 50 ml. of isopropanol cooled to about −30° C. is added a similarly cooled solution of 5.5 g. of glyoxal in 50 ml. of isopropanol. To this mixture maintained at a temperature below about −10° C., 10 ml. of 12.5 N aqueous potassium hydroxide solution are added dropwise with stirring. The reaction mixture is allowed to stand at −5° C. for 12 hours and then at room temperature for a further period of 2 hours. 10 ml. of 12 N hydrochloric acid are added to neutralize the potassium hydroxide and 5 g. of solid sodium bicarbonate are added to neutralize any excess hydrochloric acid, and the mixture is evaporated to dryness in vacuo. The residue comprising 2-hydroxy-3-(β-methylthioethyl)pyrazine is extracted with three 1000 ml. portions of boiling chloroform and the combined chloroform extracts are evaporated to dryness leaving a residue comprising 2-hydroxy-3-(β-methylthioethyl)pyrazine. The substituted pyrazine is purified by recrystallizing it from ethyl acetate. 18.3 g. (97 percent of theory) of 2-hydroxy-3-(β-methylthioethyl)pyrazine melting at about 96–97° C. are obtained.

EXAMPLE 10

*Preparation of 2-hydroxy-3-phenyl-5,6-dimethyl-pyrazine*

2 - hydroxy - 3 - phenyl - 5,6 - dimethylpyrazine represented by the formula

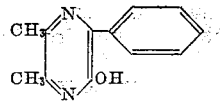

is prepared from diacetyl and α-aminophenylacetamide according to the procedure described in Example 5.

EXAMPLE 11

*Preparation of 2-hydroxy-3-(p-hydroxyphenyl)-5,6-dimethylpyrazine*

2-hydroxy-3-(p-hydroxyphenyl)-5,6-dimethylpyrazine represented by the formula

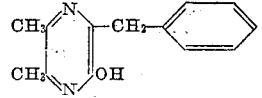

is prepared from diacetyl and tyrosine amide according to the procedure described in Example 5.

EXAMPLE 12

*Preparation of 2-hydroxy-3-hydroxymethyl-pyrazine*

2-hydroxy - 3 - hydroxymethylpyrazine represented by the formula

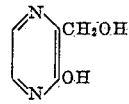

is prepared from glyoxal and serine amide according to the procedure described in Example 5.

In the above examples, the processes employed have shown the addition of the base to a mixture of the dicarbonyl compound and the amino acid amide. This order of addition is usually followed for the sake of convenience, but no particular order of addition is required to produce the desired reaction.

I claim:

1. The process of preparing hydroxypyrazines which comprises reacting a 1,2-dicarbonyl compound with an α-aminocarboxylic acid amide.

2. The process of preparing hydroxypyrazines which comprises condensing a 1,2-dicarbonyl compound with an α-aminocarboxylic acid amide in the presence of a base having a dissociation constant of at least about $1 \times 10^{-7}$, and isolating the hydroxypyrazine produced by the condensation.

3. The process according to claim 2 in which the 1,2-dicarbonyl compound is an α-keto aldehyde.

4. The process according to claim 2 in which the 1,2-dicarbonyl compound is a 1,2-diketone.

5. The process of preparing hydroxypyrazines which comprises mixing a dispersion of a 1,2-dicarbonyl compound and an α-aminocarboxylic acid amide in a solvent with a base having a dissociation constant of at least about $1 \times 10^{-7}$, neutralizing the reaction mixture, and isolating the hydroxypyrazine which is produced.

6. The process of preparing hydroxypyrazines which comprises providing in a cold solution, a mixture of approximately equivalent amounts of a 1,2-dicarbonyl compound, an α-aminocarboxylic acid amide, and a base having a dissociation constant of at least about $1 \times 10^{-7}$, warming the mixture to about room temperature, and isolating the hydroxypyrazine which is produced.

7. The process of preparing hydroxypyrazines which comprises providing a cold solution of a 1,2-dicarbonyl compound and an α-aminocarboxylic acid amide, mixing with said cold solution a base having a dissociation constant greater than about $1 \times 10^{-7}$, allowing the temperature of the reaction mixture to rise to about room temperature, neutralizing the reaction mixture with acid and separating the hydroxypyrazine which is produced.

8. The process according to claim 7 in which the base is a metal hydroxide having a dissociation constant greater than about $1 \times 10^{-7}$.

9. The process according to claim 7 in which the base is sodium hydroxide.

10. The process of preparing a hydroxypyrazine which comprises providing a dispersion of a di-(monocyclic arylhydrocarbon) - 1,2 - diketone and an α-aminocarboxylic acid amide in an inert solvent, mixing with said dispersion a base having a dissociation constant greater than about $1 \times 10^{-7}$, maintaining said solution at a temperature below about 100° C. until the diketone and the α-aminocarboxylic acid amide have substantially completely reacted, and separating the hydroxypyrazine which is produced.

11. The process of preparing a hydroxypyrazine which comprises providing a dispersion of a di-(lower aliphatic-hydrocarbon)-1,2-diketone and an aminocarboxylic acid amide in an inert solvent, mixing with said dispersion a base having a dissociation constant greater than about $1 \times 10^{-7}$, maintaining said solution at a temperature below about 100° C. until the diketone and the α-aminocarboxylic acid amide have substantially completely reacted, and separating the hydroxypyrazine which is produced.

REUBEN G. JONES.

REFERENCES CITED

The following references are of record in the file of this patent:

Krems et al., Chemical Reviews, 40, 311 (1947).